United States Patent
Eldawy et al.

(10) Patent No.: US 8,768,929 B2
(45) Date of Patent: Jul. 1, 2014

(54) CLUSTERING STREAMING GRAPHS

(75) Inventors: Ahmed S. Eldawy, Saint Paul, MN (US); Rohit M. Khandekar, Jersey City, NJ (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/517,824

(22) Filed: Jun. 14, 2012

(65) Prior Publication Data

US 2013/0339355 A1   Dec. 19, 2013

(51) Int. Cl.
*G06F 17/30* (2006.01)

(52) U.S. Cl.
USPC .......................................................... 707/737

(58) Field of Classification Search
USPC .......................................................... 707/737
See application file for complete search history.

(56) References Cited

U.S. PATENT DOCUMENTS

| | | | |
|---|---|---|---|
| 7,899,861 B2 | 3/2011 | Feblowitz et al. | |
| 7,945,540 B2 | 5/2011 | Park et al. | |
| 2010/0040296 A1* | 2/2010 | Ma et al. | 382/225 |
| 2010/0115206 A1 | 5/2010 | de la Iglesia et al. | |
| 2011/0066600 A1 | 3/2011 | Cormode et al. | |
| 2011/0313977 A1 | 12/2011 | Al-Kateb et al. | |
| 2011/0314019 A1 | 12/2011 | Jimenez Peris et al. | |

OTHER PUBLICATIONS

Aggarwal, Charu C. et al., "Outlier Detection in Graph Streams", 27th IEEE International conference on Data Engineering, 2001, 11 pages.

Charikar, Moses "Greedy Approximation Algorithms for Finding Dense Components in a Graph", Stanford University, Stanford, CA 94305, U.S.A., Proc. 3rd Intl. Workshop on Approximation Algorithms for Combinatorial Optimazation, 2000.

Clustering Data Streams: Theory and Practice, IEEE Transactions on knowledge and Data Engineering, vol. 15, No. 3, May-Jun. 2003, pp. 515-528.

Khandekar, et al. "Bounded Size Graph Clustering with Applications to Stream Processing", IBM T.J. Watson Research Center, PSTTCS 2009, pp. 275-286.

* cited by examiner

*Primary Examiner* — Rehana Perveen
*Assistant Examiner* — Alexander Khong
(74) *Attorney, Agent, or Firm* — Cantor Colburn LLP; William J. Stock (57) ABSTRACT

A system for clustering vertices in a streaming graph includes a structural sampler configured to receive a stream of edges. The structural sampler includes a reservoir manager configured to receive the stream of edges and create a structural reservoir and a support reservoir and a graph manager configured to receive the structural reservoir from the reservoir manager and to create a sampled graph from the structural reservoir, wherein the sampled graph includes one or more clusters that each include one or more connected vertices.

15 Claims, 7 Drawing Sheets

CLUSTERING STREAMING GRAPHS

BACKGROUND

The present invention relates to streaming graphs, and more specifically, to methods and systems for identifying clusters in a streaming graph.

Graphs are effective tools for representing collections of relationships between entities. These relationships could be, for example, social ties between people, communications links between computer systems, links between web-pages, transportation channels between locations, or chemical bonds between atoms or molecules. Graphs are rich sources of information regarding how the entities behave and interact with each other. The field of graph analytics, or graph data mining, is devoted to understanding and decoding this information by studying structural properties of the graph and observing how graphs evolve with time. This information can then be put to use in several applications like online marketing, ranking search results, recommendation systems, churn prediction in mobile networks, disease control and drug discovery, to name a few.

One area of graph analytics includes the clustering or partitioning of nodes, or vertices, of graphs. Graph clustering has been the subject of research mainly in an offline setting where the entire graph is given beforehand. Graph clustering has been used for a wide variety of applications such as detecting communities in social networks, constructing phylogenetic trees or analyzing human genes, and load balancing in distributed computing. However, current clustering methods are not suitable for use with streaming graphs where the updates to the graph include streaming edge and/or vertex additions or deletions.

SUMMARY

According to an exemplary embodiment, a system for clustering vertices in a streaming graph includes a structural sampler configured to receive a stream of edges. The structural sampler includes a reservoir manager configured to receive the stream of edges and create a structural reservoir and a support reservoir and a graph manager configured to receive the structural reservoir from the reservoir manager and to create a sampled graph from the structural reservoir, wherein the sampled graph includes one or more clusters that each include one or more connected vertices.

According to another exemplary embodiment, a system for clustering vertices in a streaming graph including a window manager configured to receive a stream of new edges and responsively create a stream of graph updates. The system also includes a structural sampler configured to receive the stream of graph updates. The structural sampler includes a reservoir manager configured to receive the stream of graph updates and create a structural reservoir and a support reservoir and a graph manager configured to receive the structural reservoir from the reservoir manager and to create a sampled graph from the structural reservoir, wherein the sampled graph includes one or more clusters that each include one or more connected vertices. The reservoir manager is configured to manage the structural reservoir to ensure that the one or more clusters of the sampled graph have a size that does not exceed a maximum cluster size.

According to a further exemplary embodiment, a computer program product for identifying one or more clusters in a streaming graph, the computer program product including a tangible storage medium readable by a processing circuit and storing instructions for execution by the processing circuit for performing a method. The method includes receiving a stream of edges and sampling, with a processor, the stream of edges to create a structural reservoir and support reservoir. The method also includes creating a sampled graph from the structural reservoir and identifying the one or more clusters in the sampled graph by grouping one or more connected vertices in the sampled graph.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
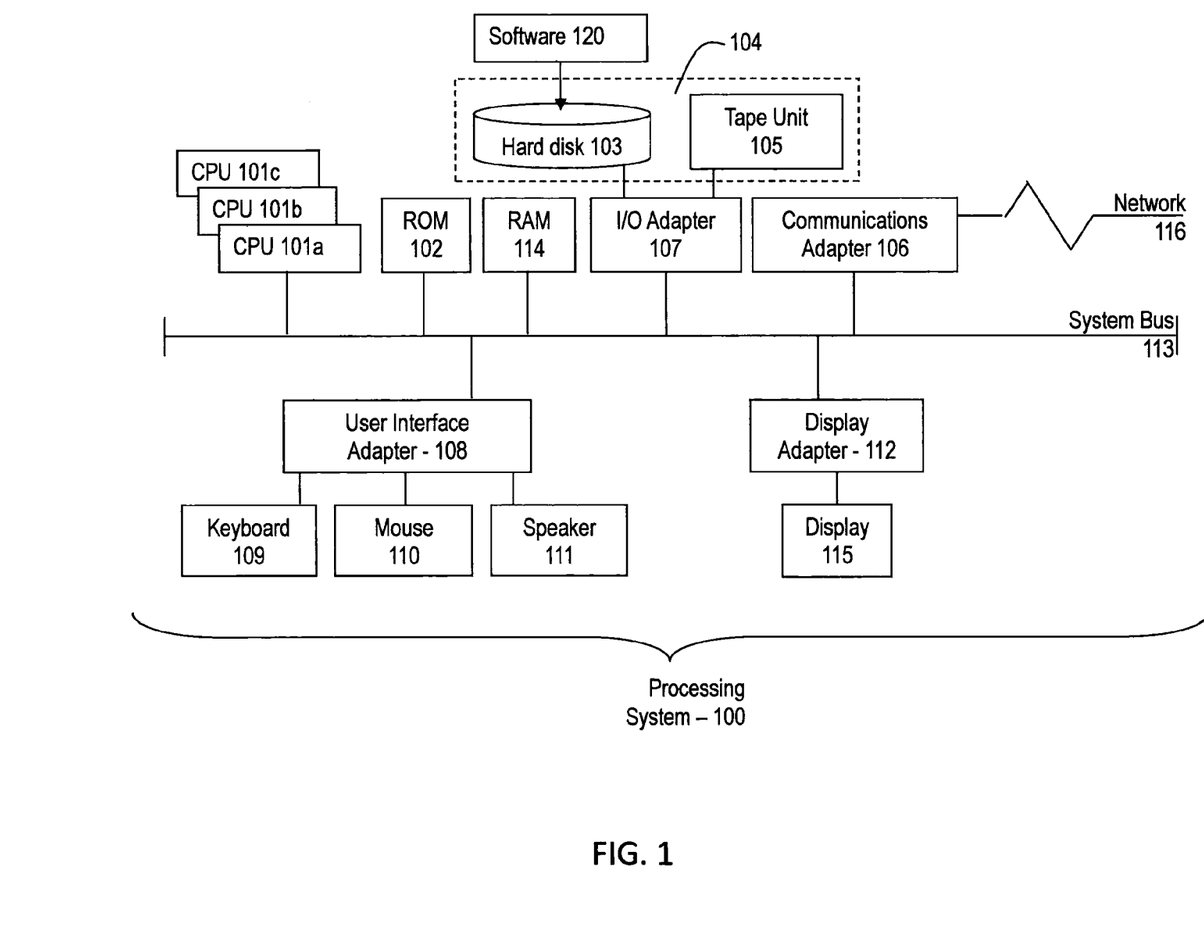
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, a direct access storage device or hard disk 103, and tape storage device 105 are collectively referred to herein as mass storage 104. A network adapter 106 interconnects bus 113 with an outside network 116 enabling data processing system 100 to communicate with other such systems and external storage devices. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the z/OS® operating system from IBM Corporation to coordinate the functions of the various components shown in FIG. 1.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, z/OS or any other suitable operating system. The system 100 also includes a network interface 116 for communicating over a network. The network can be a local-area network (LAN), a metro-area network (MAN), or wide-area network (WAN), such as the Internet or World Wide Web. Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11a, 802.11b, 802.11g).

As disclosed herein, the system 100 includes machine readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as a "command line testing tool" 120, an "a testing interface" 120 or by other similar terms. The software 120 may include various tools and features for providing user interaction capabilities as are known in the art. The software 120 can include a database management subsystem such as DB2®, which manages structured data access requests and queries from end users and applications.

Figure 2A:
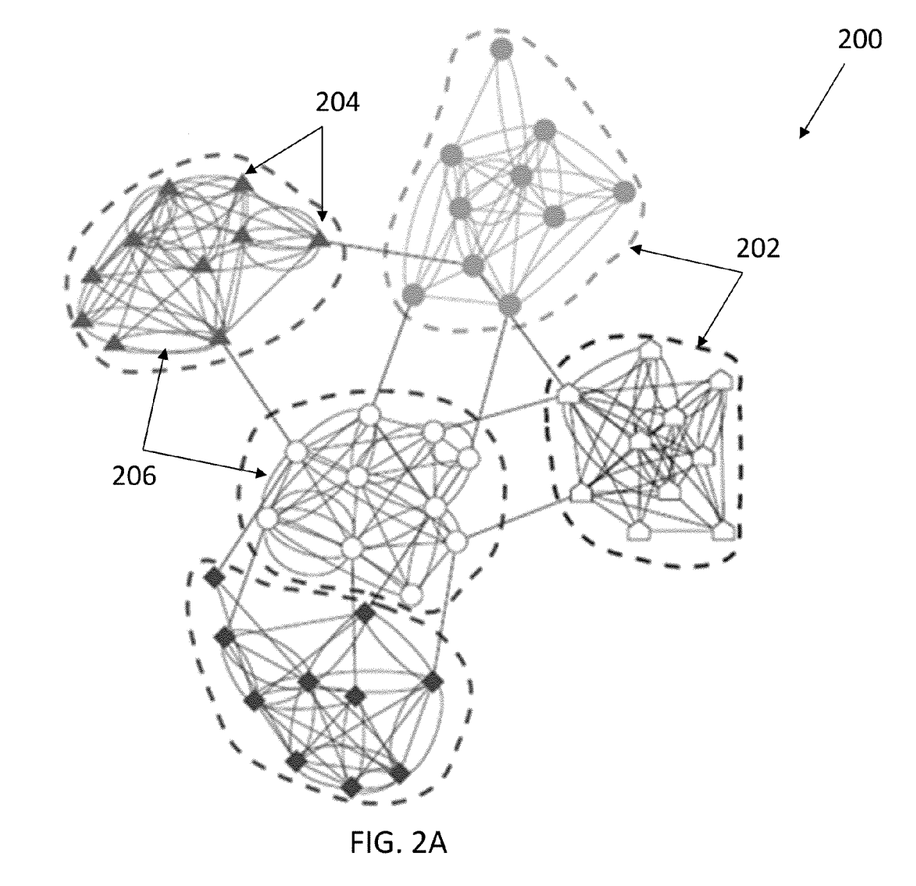
FIG. 2A is a graph illustrating a complete graph in accordance with an embodiment of the present disclosure.

Referring now to FIG. 2A, a complete graph 200 illustrating five clusters 202 is shown. As illustrated, each of the clusters 202 include a plurality of vertices 204 that are connected by one or more edges 206. The vertices 204 may be grouped in clusters 202 by a variety of known methods. In general, the vertices 204 belonging to a cluster 202 will be connected to a larger number of vertices 204 of the same cluster 202 than to vertices 204 of another cluster 202. In exemplary embodiments, the clusters 202 may have a maximum cluster size, which is the maximum number of vertices 204 that may be grouped into a single cluster 202.

Figure 2B:
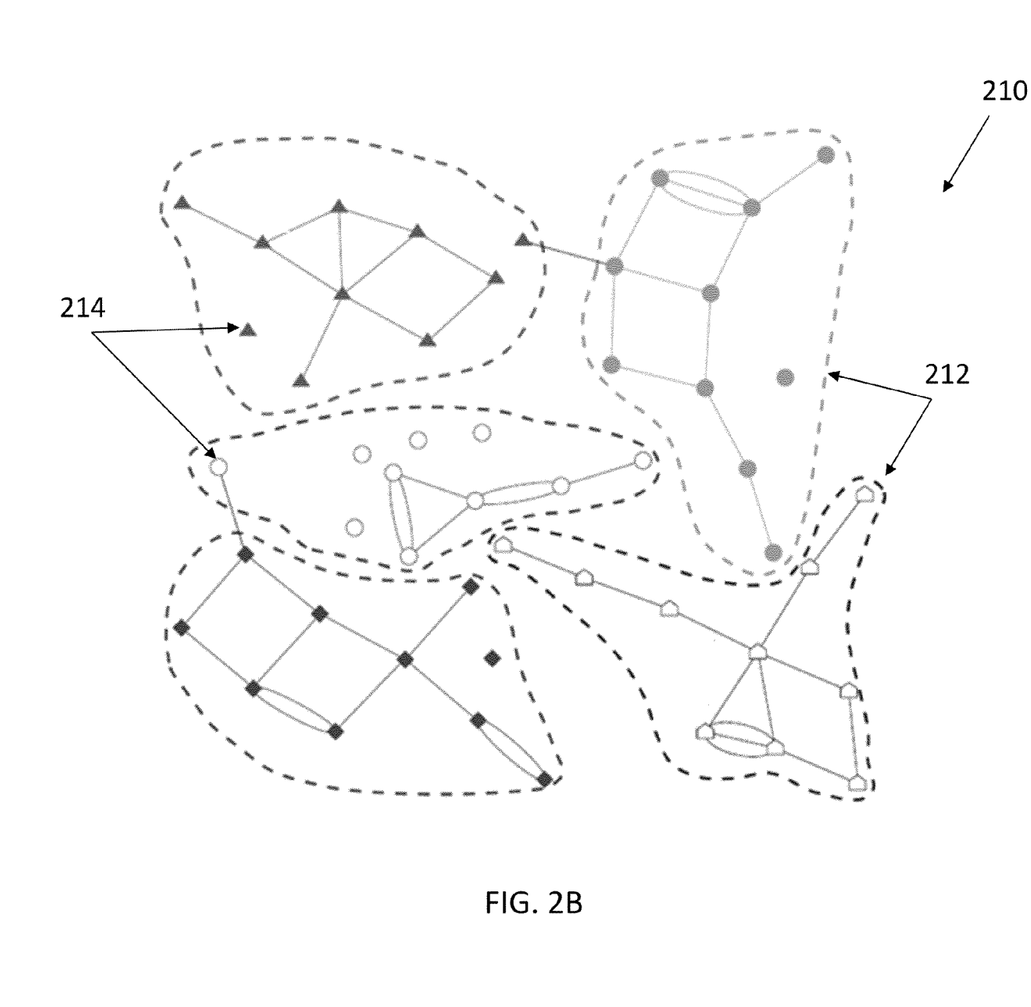
FIG. 2B is a graph illustrating a sampled graph in accordance with an embodiment of the present disclosure.

Referring now to FIG. 2B, a sampled graph 210 representing a sampled version of the complete graph 200 depicted in FIG. 2A is shown. As illustrated, the sampled graph 210 includes five clusters 212 each having a plurality of vertices 214. In exemplary embodiments, the sampled graph 210 may be constructed by randomly sampling a percentage of the data used to construct the complete graph 200. In exemplary embodiments, the sampled graph 210 is constructed to include all of the vertices 204 of the complete graph 200 and a percentage of the edges 206 of the complete graph 200. In exemplary embodiments, the percentage of the edges 206 that are used to construct the sampled graph 210 may vary depending on various factors such as memory availability, rate of streaming updates, time window, quality of clustering, and the like.

In one embodiment, as illustrated in FIG. 2B, the sampled graph 210 may be constructed to include twenty percent of the edges 206 of the complete graph 200. In exemplary embodiments, the sampling percentage is ideally high enough such that a reasonable clustering of the complete graph 200 is identifiable from the sampled graph 210. In exemplary embodiments, the clusters 212 may have a maximum cluster size, which is the maximum number of vertices 214 that may be grouped into a single cluster 212. In the exemplary sampled graph 210 shown in FIG. 2B, the maximum cluster size is ten.

Figure 3:
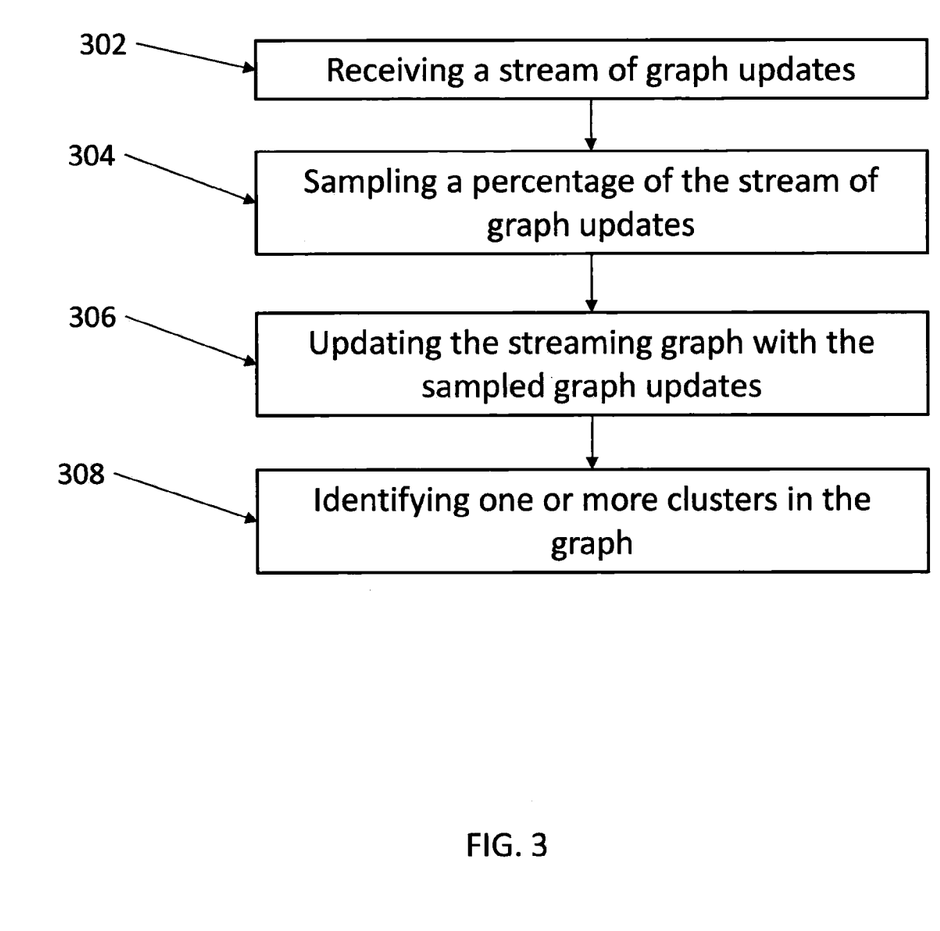
FIG. 3 is a flow diagram that illustrates a method for identifying clusters in a streaming graph in accordance with an exemplary embodiment.

Referring now to FIG. 3, a flow diagram of a method 300 for identifying clusters in a streaming graph in accordance with an exemplary embodiment is shown. As illustrated at block 302, the method includes receiving a stream of graph updates. In exemplary embodiments, the graph updates may include vertex and/or edge insertions or deletions. Next, the method includes sampling a percentage of the stream of graph updates, as illustrated by block 304. As shown at block 306, the method also includes updating the streaming graph with the sampled graph updates. The method also includes identifying one or more clusters in the graph, as illustrated by block 308. In exemplary embodiments, the one or more clusters may be identified by grouping all connected vertices into a cluster. In exemplary embodiments, updating the streaming graph with the sampled graph updates includes ensuring that adding the graph updates to the streaming graph will not cause the sampled graph to have a cluster with more vertices than the maximum cluster size.

In exemplary embodiments, sampling a percentage of the stream of graph updates can be done by assigning each newly received graph update, or new edge, a ranking, which may be a random number between zero and one. After the graph update has been assigned a ranking, the ranking is compared to the sampling percentage and if the ranking is above the sampling percentage the graph update is discarded. If the ranking is equal to or less than the sampling percentage, the graph update is added to an array of sampled graph updates. In exemplary embodiments, the array of sampled graph updates is an ordered array that includes each of the graph updates that were not discarded ordered by the ranking of the graph updates.

In exemplary embodiments, a sampled graph can be constructed such that each graph update is sampled with probability of at most the sampling percentage and that each cluster has size no greater than the maximum cluster size. The sampled graph may be constructed by sequentially adding the graph updates from the array of sampled graph updates in a one-by-one fashion beginning with the graph update with the lowest ranking. Before each graph update is added to the sampled graph, the sampled graph is checked to determine if adding the graph update to the sampled graph will result in a connected component of the graph having more vertices than the maximum cluster size. If adding the graph update to the sampled graph will not result in a connected component of the graph having more vertices than the maximum cluster size, the graph update is added to the sampled graph and to a structural reservoir. If adding the graph update to the sampled graph will result in a connected component of the graph having more vertices than the maximum cluster size, the graph update is not added to the sampled graph and is added to a support reservoir. After processing all of the graph updates in the array of sampled graph updates, the connected vertices of the sampled graph are determined to be clusters. In one embodiment, the structural reservoir and support reservoir may be separate arrays of graph updates. In another embodiment, the array of sampled graph updates may include an indication of whether each graph update has been assigned to the support reservoir or the structural reservoir.

In exemplary embodiments, the sampling percentage is selected to be large enough to ensure that clusters have a large enough average size to be identifiable as clusters and to be small enough such that the support reservoir is not too large. If the sampling percentage is too low, clusters with an average size significantly smaller than the maximum cluster size can result. On the other hand, if the sampling percentage is too high, the size of the support reservoir may be very large, thereby increasing the space required to store the support reservoir.

Figure 4:
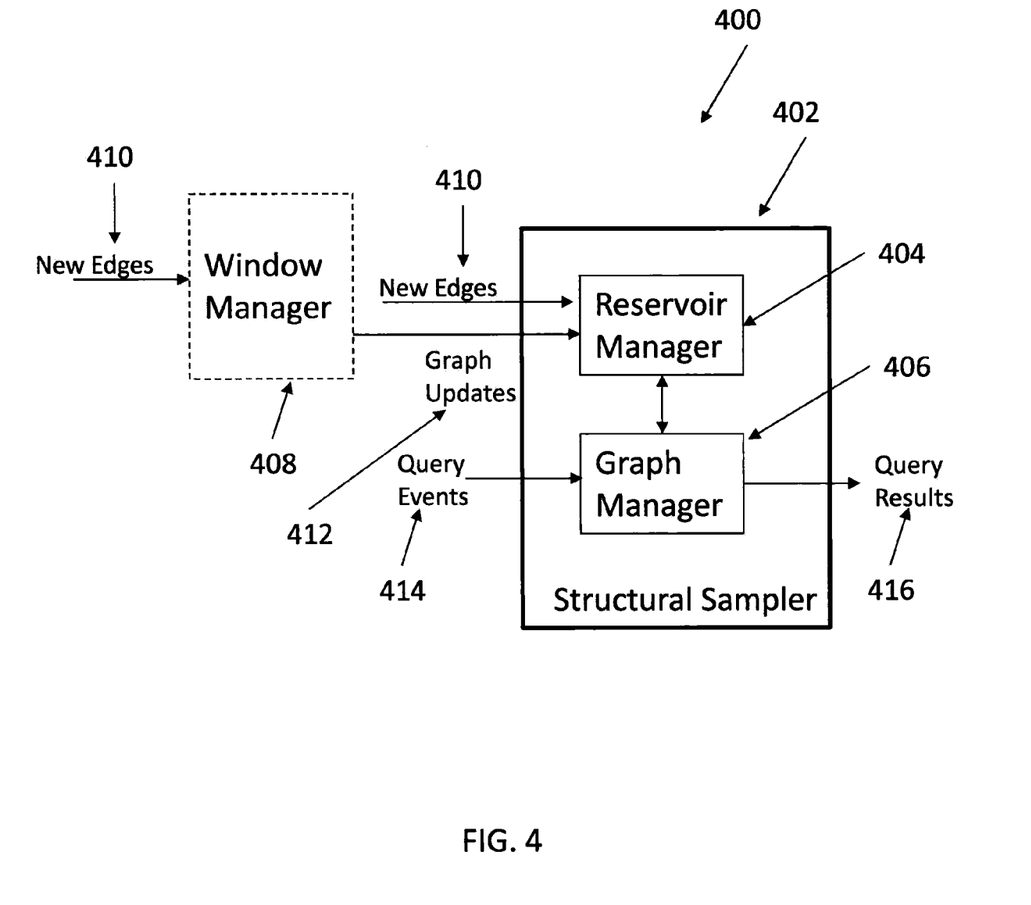
FIG. 4 is a block diagram of a system for identifying clusters in a streaming graph in accordance with an exemplary embodiment.

Referring now to FIG. 4 a block diagram of a system 400 for clustering a streaming graph in accordance with an exemplary embodiment is shown. As illustrated, the system 400 includes a structural sampler 402 and may include a window manager 408. In exemplary embodiments, the window manager 408 may be used to maintain a graph over certain window of time, i.e., a sliding time window. The system 400 includes a stream of new edges 410 that arrive continuously. In an embodiment that includes a window manager 408, the window manager 408 accepts the stream of new edges 410 and produces a stream of graph updates 412 according to the specified window settings. In exemplary embodiments, a reservoir manager 404 of the structural sampler 402 may be configured to receive the stream of graph updates 412 from the window manager 408 or the stream of new edges 410 directly from a source (not illustrated). The reservoir manager 404 maintains a running sample of edges in the structural reservoir and the support reservoir. The sampled edges in the structural reservoir are passed to a graph manager 406 by the reservoir manager 404. In exemplary embodiments, the graph manager 406 performs all graph related operations and keeps track of current clusters. In exemplary embodiments, query events 414 are sent directly to the graph manager 406 which responsively produces query results 416.

In exemplary embodiments, the window manager 408 is configured to support the processing of events according a specific window configuration. In exemplary embodiments, the window manager 408 is a preprocessing phase to determine edge insertions and deletions from a stream of edges 410. The window manager 408 may be configured to support a time-based sliding window that keeps track of all events within a desired time period. Sliding means the time period of the time window is always counted from a current timestamp, i.e., it slides with time. Events that fall outside the window need to be evicted or deleted from the underlying system as the time advances. In an alternative exemplary embodiment, the window manager 408 may be configured to support a count-based tumbling window of desired number of items. In this configuration, new edges are added to the window without doing any processing. However, when the window fills up (i.e., the number of items reaches the desired number of items), items within the current window are all processed and then the window is cleared which means all items are removed from the window, i.e., the window tumbles. Based on the selected window configuration, the window manager 408 includes the appropriate data structures to identify which edges to be evicted and when to evict them.

In exemplary embodiments, the reservoir manager 404 receives the steaming graph updates 412, which include edge insertions and evictions, from window manager 408. Based on current state of the sampled graph, the reservoir manager 404 decides which edges to add to the sampled graph and which edges to remove from it. The reservoir manager 404 is configured to randomly sample a maximum number of edges while keeping size of largest connected component at most the maximum cluster size. In exemplary embodiments, once the reservoir manager 404 has received as plurality of edges it randomly adds the sampled edges to the sampled graph in a one-by-one manner. The reservoir manager 404 will continue adding the sampled edges to the sampled graph as long as doing so does not violate the clustering constraint, i.e., the size of largest connected component in the sampled graph does not exceed the maximum cluster size. If adding a sampled edge to the sampled graph would violate the clustering constraint, the reservoir manager 404 does not add the edge to the sampled graph and move on to the next edge. This skipped edge is considered conflicting with current set of sampled edges and is added to a support reservoir, which is a list of sampled edges that are conflicting with current set of sampled edges in the sampled graph. Once the reservoir manager 404 has processed all of the sampled edges, the connected vertices in the sampled graph are determined to be clusters. In exemplary embodiments, the reservoir manager 404 is configured such that the sampled graph maintains two properties, conformity and maximality. As used herein, conformity means that the sampled graph satisfies the clustering constraint, while maximality means that no more sampled edges can be added to the sampled graph from the support reservoir without violating the clustering constraint.

Figure 5:
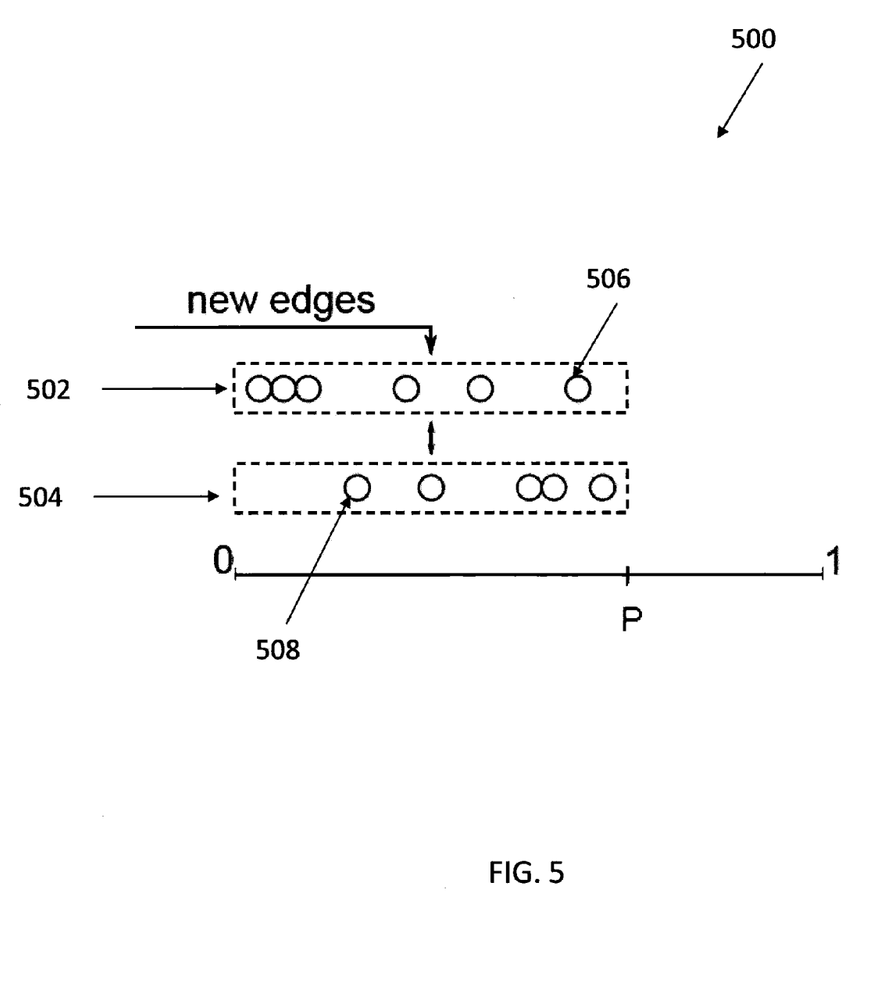
FIG. 5 is a block diagram of a storage portion of a reservoir manager in accordance with an exemplary embodiment.

Referring now to FIG. 5, a diagram illustrating an example of a storage portion 500 of the reservoir manager is shown. As shown, storage portion 500 of the reservoir manager includes two reservoirs of edges, a structural reservoir 502 and a support reservoir 504. The structural reservoir 502 contains sampled edges 506 that have been included in the sampled graph and passed to the graph manager. The support reservoir 504 contains sampled edges 508 that are not included in the sampled graph because the edges are conflicting with current set of sampled edges in the sampled graph. In exemplary embodiments, the support reservoir 504 can be used to recover the maximality of sampled edges as edges are removed from structural reservoir. In exemplary embodiments the sampled edges 506, 508 of the structural reservoir 502 and the support reservoir 504 may be arranged by a ranking, which is a random number assigned to each sampled edge. In exemplary embodiments, the rankings of the sampled edges 506, 508 may range from zero to a sampling percentage P, which is less than one.

In exemplary embodiments, the reservoir manager 404 may execute an insertion method each time a new edge is received by the reservoir manager 404. The insertion method is configured to ensure that both conformity and maximality properties of the sampled graph are maintained after receiving the new edge. The first step in the insertion method is to assign the new edge a random position in the structural reservoir 502 and then to add the edge to the sampled graph. Next, the method includes testing the sampled graph for conformity. If the conformity constraint is satisfied, the method proceeds to process the next new edge received. However, if the conformity constraint is not satisfied, the method includes restoring the conformity of the sampled graph and ensuring the sampled graph is maximal. In exemplary embodiments, the reservoir manager 404 restores the conformity of the sampled graph by un-sampling some edges, i.e., moving edges from the structural reservoir to the support reservoir. As a result of un-sampling edges during the restoration of the sampled graph, the maximality constraint of the sampled graph may no longer be satisfied. Accordingly, the reservoir manager 404 can ensure the maximality of the sampled graph by sampling one or more edges from the support reservoir to the structural reservoir.

In exemplary embodiments, the insertion method may remove edges from the structural reservoir to support reservoir until the conformity constraint is met. In one embodiment, the last sampled edge is the first edge to be removed from structural reservoir and moved it to support reservoir. Since the insertion method adds the sample edges to the structural reservoir in the generated random order, un-sampling the edges from the structural reservoir is preformed in the reverse order. Removing an edge from structural reservoir is reflected in the sampled graph by deleting the edge.

The following is pseudocode of an exemplary insertion algorithm that can be executed by the reservoir manager:

```
1: Function ReservoirManagerInsert(newEdge, structuralReservoir, supportReservoir, graphManager)
2: Generate a random position pos ϵ (0, 1] for the newEdge
3: Insert the newEdge in structuralReservoir at position pos
4: Insert the newEdge in the graphManager
5: if constraint is not satisfied in graphManager then
6:    while constraint is not satisfied in graphManager do
7:       Remove lastEdge with highestPosition from structuralReservoir
8:       Insert the lastEdge to supportReservoir at its assigned position
9:       Remove lastEdge from graphManager
10:   end while
11:   Search for all edges from supportReservoir with positions higher than the last removed edge in line 7
12:   for each edge in search results do
13:      Insert the edge in graphManager
14:      if constraint is not satisfied in graphManager then
15:         Delete the edge from graphManager
16:      else
17:         Move the edge from supportResevoir to structuralReservoir
18:      end if
19:   end for
20: end if
```

In exemplary embodiments, the reservoir manager 404 may execute a deletion method each time an edge is to be deleted by the reservoir manager 404. The edge to be deleted might be either in the structural or the support reservoir. In exemplary embodiments, the method first determines if the edge to be deleted is in the support reservoir. If the edge to be deleted is in the support reservoir it is deleted and the method concludes. Otherwise, the edge to be deleted from the structural reservoir is removed from the sampled graph. Since deleting an edge from the sampled graph might cause the sampled graph to no longer be maximal, the method includes determining if the support reservoir includes any edges that can be added to the structural reservoir. If the support reservoir includes edges that can be added to the structural reservoir, the method adds those edges to the structural reservoir and sampled graph, thereby restoring the maximality of the sampled graph.

The following is pseudocode of an exemplary deletion algorithm that can be executed by the reservoir manager:

```
1: Function ReservoirManagerDelete(edge, structuralReservoir, supportReservoir, graphManager)
2: Try to remove the edge from supportReservoir
3:    if edge is present in structuralReservoir then
4:       Remove the edge from structuralReservoir and graphManager
5:       Search for all edges from supportReservoir with positions higher than the removed edge
6:    for each edge in search results do
7:       Insert the edge in graphManager
8:       if constraint is not satisfied in graphManager then
9:          Delete the edge from graphManager
10:       else
11:          Move the edge from supportResevoir to structuralReservoir
12:       end if
13:    end for
14: end if
```

Figure 6:
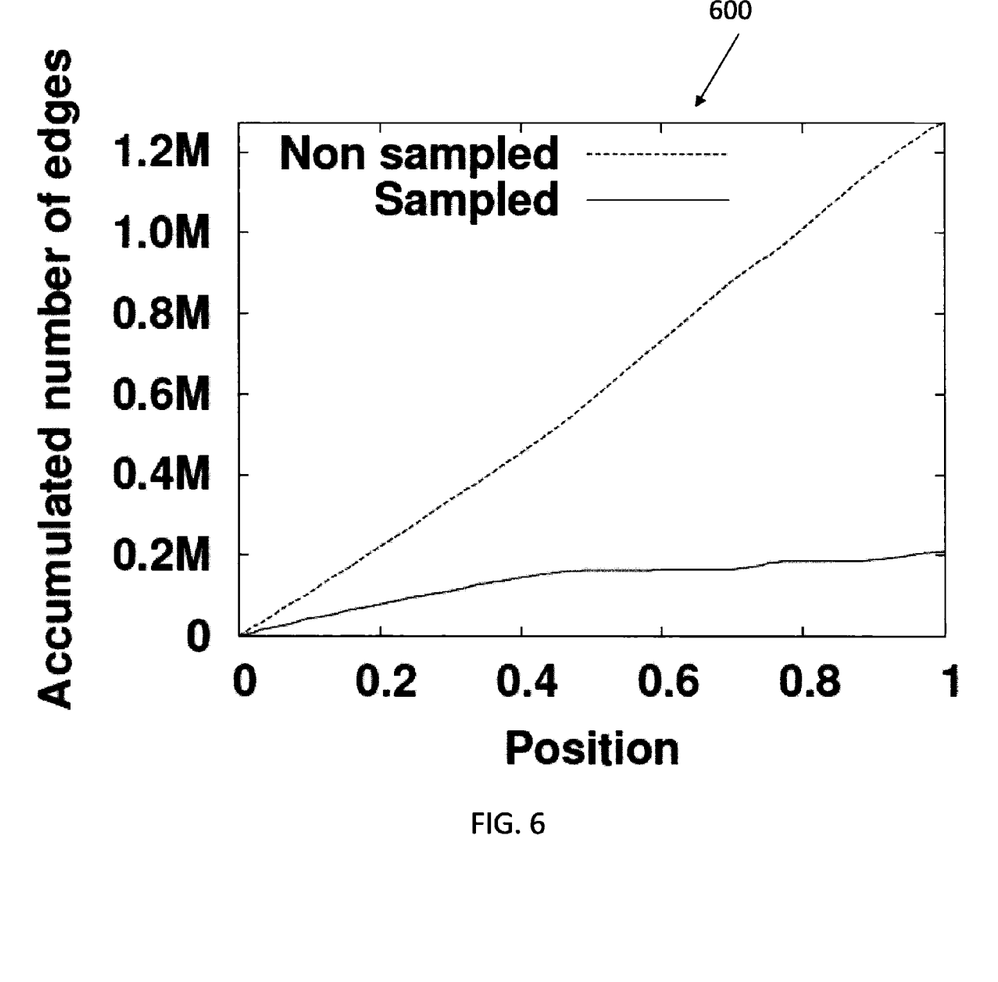
FIG. 6 is a graph illustrating a total number of edges sampled compared to number of non-sampled edges in accordance with an exemplary embodiment.

Referring now to FIG. 6, a graph 600 illustrating the results of testing of a streaming graph clustering system over a wide range of real graphs is shown. FIG. 6 shows the total number of edges sampled compared to number of non-sampled edges. FIG. 6 was created by taking a snapshot while the streaming graph clustering system was running and accumulating number of sampled and non-sampled edges at different positions. At each position, the solid line represents total number sampled edges with lower positions, while the dotted line represents total number of edges that were not sampled or were redundant. Non-sampled edges are edges that caused size of largest cluster to grow beyond the maximum cluster size, and hence, were moved to the support reservoir. Redundant edges are those edges that are connecting two vertices already in the same cluster. Although redundant edges are sampled in the structural reservoir, they do not actually affect the sampled graph because they do not affect the structure of connected vertices.

As illustrated in the graph 600, a high percentage of the non-sampled edges are at positions higher than 0.5 because the reservoir manager samples edges by ascending positions. Accordingly, it is more likely for edges with a higher position, or ranking, to be conflicting with previous edges and hence not sampled. Accordingly, a sampling threshold or sampling percentage for inserted edges should be applied. The sampling percentage is selected such that all edges with positions larger than the sampling percentage, are not processed or even stored. Choosing a lower sampling percentage saves memory and processing resources but it might affect the quality of sampled graph because more edges are dropped without processing. Similarly, increasing the sampling percentage produces higher quality answers at the cost of more memory and processing time. In exemplary embodiments, the sampling percentage can be adjusted to maximize restrained resources while keeping clustering quality at an acceptable level.

Those skilled in the art will appreciate that the dependence of the memory usage and the clustering quality on the sampling percentage can be modeled by a piece-wise linear monotone function. For a given sampling quality and a given memory size, the required sampling rate can be inferred from this function. This dependence function can be continuously learned and maintained via an explore-exploit paradigm. Recent data points can be given more weight while old data points can be retired.

In exemplary embodiments, if a single host does not have enough memory to store all the edges in the two reservoirs, the storage and/or computational can be distributed across multiple hosts. In one embodiment, after the new edges are assigned rankings, which are a random number between zero and one, the edges are assigned to a host based on those rankings. Each host is responsible for maintaining the parts of the structural and support reservoirs that fall into its assigned range. In addition, each host also includes a graph manager that manages the sub-graph associated with the data stored on the host. In exemplary embodiments, a front-end host that ingests the streaming updates and assigns the random rankings based on a hash function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for clustering vertices in a streaming graph, comprising:
   a structural sampler comprising a processor configured to receive a stream of graph updates including insertions and deletions of edges and vertices to the streaming graph, the structural sampler comprising:
   a reservoir manager configured to receive the stream of graph updates and create a structural reservoir and a support reservoir, wherein the creation of the structural reservoir and support reservoir comprises:
      assigning a random ranking to each received edge;
      discarding each received edge with the random ranking greater than a sampling rate; and
      adding each of the received edges with the random ranking less than a sampling rate to the structural reservoir; and
   a graph manager configured to receive the structural reservoir from the reservoir manager and to create a sampled graph from the structural reservoir, wherein the sampled graph includes one or more clusters that each include one or more connected vertices,
   wherein creating the structural reservoir further comprises based on determining that adding a graph update to the structural reservoir caused the one or more clusters of the sampled graph have a size that exceeds the maximum cluster size, moving one or more graph updates from the structural reservoir to the support reservoir.

2. The system of claim 1, wherein the structural reservoir is an array of edges ordered by the random rankings assigned to the edges in the support reservoir array.

3. The system of claim 2, wherein the support reservoir is an array of edges ordered by the random rankings assigned to the edges in the support reservoir array, wherein edges in the support reservoir array are conflicting with the edges in the support reservoir array.

4. The system of claim 3, wherein a conflicting edge is a graph update that would cause the size of the one or more clusters of the sampled graph to exceed a maximum cluster size if the conflicting edge was added to the structural reservoir.

5. The system of claim 1, wherein the sampling rate is determined based on a size of a memory of the structural sampler and a required clustering quality.

6. The system of claim 5, wherein the sampling rates is continuously calculated by a piece-wise linear monotone function.

7. A system for clustering vertices in a streaming graph, comprising:
   a window manager comprising a processor configured to receive a stream of new edges and responsively create a stream of graph updates;
   a structural sampler configured to receive the stream of graph updates, the structural sampler comprising:
      a reservoir manager configured to receive the stream of graph updates and create a structural reservoir and a support reservoir, wherein the creation of the structural reservoir and support reservoir comprises:
         assigning a random ranking to each received edge;
         discarding each received edge with the random ranking greater than a sampling rate; and
      adding each of the received edges with the random ranking less than a sampling rate to the structural reservoir; and
   a graph manager configured to receive the structural reservoir from the reservoir manager and to create a sampled graph from the structural reservoir, wherein the sampled graph includes one or more clusters that each include one or more connected vertices;
   wherein the reservoir manager is configured to manage the structural reservoir to ensure that the one or more clusters of the sampled graph have a size that does not exceed a maximum cluster size, and
   wherein creating the structural reservoir further comprises based on determining that adding a graph update to the structural reservoir caused the one or more clusters of the sampled graph have a size that exceeds the maximum cluster size, moving one or more graph updates from the structural reservoir to the support reservoir.

8. The system of claim 7, wherein the structural reservoir is an array of graph updates ordered by the random rankings assigned to the graph updates in the support reservoir array.

9. The system of claim 8, wherein the support reservoir is an array of graph updates ordered by the random rankings assigned to the graph updates in the support reservoir array, wherein graph updates in the support reservoir array are conflicting with the graph updates in the support reservoir array.

10. The system of claim 9, wherein a conflicting graph update is a graph update that would cause the size of the one or more clusters of the sampled graph to exceed a maximum cluster size if the conflicting graph update was added to the structural reservoir.

11. The system of claim 10, wherein the graph manager is configured to receive a query regarding sampled graph and to responsively generate query responses based on the sampled graph.

12. A computer program product for identifying one or more clusters in a streaming graph, the computer program product comprising:
   a non-transitory storage medium readable by a processing circuit and storing instructions for execution by the processing circuit for performing a method comprising:
      receiving a stream of edges;

sampling, with a processor, the stream of edges to create a structural reservoir and support reservoir, wherein the creating of the structural reservoir and support reservoir comprises:

assigning a random ranking to each received edge;

discarding each received edge with the random ranking greater than a sampling rate; and adding each of the received edges with the random ranking less than a sampling rate to the structural reservoir, wherein creating of the structural reservoir and support reservoir further comprises based on determining that adding an edge to the structural reservoir caused the one or more clusters of the sampled graph have a size that exceeds the maximum cluster size, moving one or more edges from the structural reservoir to the support reservoir:

creating a sampled graph from the structural reservoir; and identifying the one or more clusters in the sampled graph by grouping one or more connected vertices in the sampled graph.

13. The computer program product of claim 12, wherein the structural reservoir is an array of edges ordered by the random rankings assigned to the edges in the support reservoir array.

14. The computer program product of claim 13, wherein the support reservoir is an array of edges ordered by the random rankings assigned to the edges in the support reservoir array, wherein edges in the support reservoir array are conflicting with the edges in the support reservoir array.

15. The computer program product of claim 14, wherein a conflicting edge is a graph update that would cause the size of the one or more clusters of the sampled graph to exceed a maximum cluster size if the conflicting edge was added to the structural reservoir.

* * * * *